(12) United States Patent
Wilder et al.

(10) Patent No.: US 11,839,840 B2
(45) Date of Patent: Dec. 12, 2023

(54) WATER TREATMENT DEVICE

(71) Applicant: STRAUSS WATER LTD, Or Yehuda (IL)

(72) Inventors: Haim Wilder, Ra'anana (IL); Hella Frenkel, Kfar Saba (IL)

(73) Assignee: STRAUSS WATER LTD, Or Yehuda (IL)

( * ) Notice: Subject to any disclaimer, the term of this patent is extended or adjusted under 35 U.S.C. 154(b) by 0 days.

(21) Appl. No.: 16/604,810

(22) PCT Filed: Apr. 18, 2018

(86) PCT No.: PCT/IL2018/050441
§ 371 (c)(1),
(2) Date: Oct. 11, 2019

(87) PCT Pub. No.: WO2018/193455
PCT Pub. Date: Oct. 25, 2018

(65) Prior Publication Data
US 2020/0078714 A1    Mar. 12, 2020

Related U.S. Application Data

(60) Provisional application No. 62/487,495, filed on Apr. 20, 2017.

(51) Int. Cl.
| | | |
|---|---|---|
| *B01D 29/52* | (2006.01) |
| *B01D 39/18* | (2006.01) |
| *B01D 39/20* | (2006.01) |
| *C02F 1/00* | (2023.01) |
| *C02F 1/28* | (2023.01) |
| *C02F 1/50* | (2023.01) |

(Continued)

(52) U.S. Cl.
CPC ............. *B01D 29/52* (2013.01); *B01D 39/18* (2013.01); *B01D 39/2062* (2013.01); *C02F 1/001* (2013.01); *C02F 1/281* (2013.01); *C02F 1/283* (2013.01); *C02F 1/288* (2013.01); *C02F 1/505* (2013.01); *C02F 1/68* (2013.01); *C02F 5/04* (2013.01); *B01D 2239/0407* (2013.01); *B01D 2239/065* (2013.01); *C02F 2101/20* (2013.01); *C02F 2201/003* (2013.01); *C02F 2307/14* (2013.01)

(58) Field of Classification Search
None
See application file for complete search history.

(56) References Cited

U.S. PATENT DOCUMENTS 2,399,972 A  *  5/1946  Zibelman ........... A63H 33/3016
181/138
3,327,859 A  *  6/1967  Pall ........................ C02F 1/002
210/266

(Continued)

FOREIGN PATENT DOCUMENTS

| CN | 1777465 A | 5/2006 |
| CN | 202654789 U | 1/2013 |

(Continued)

*Primary Examiner* — Chester T Barry
(74) *Attorney, Agent, or Firm* — XSENSUS LLP

(57) ABSTRACT

Provided concerns a device for treating water of the kind intended for treating running water from a domestic water supply system or other sources of pressurized water, to obtain filtered or treated water, for example, of drinking water quality.

15 Claims, 7 Drawing Sheets

(51) Int. Cl.
*C02F 1/68* (2023.01)
*C02F 5/04* (2023.01)
*C02F 101/20* (2006.01)

(56) References Cited

U.S. PATENT DOCUMENTS

| | | | |
|---|---|---|---|
| 3,538,020 A * | 11/1970 | Heskett | B01J 20/28042 |
| | | | 524/13 |
| 5,976,362 A | 11/1999 | Wadsworth et al. | |
| 6,113,784 A * | 9/2000 | Stoyell | B01D 29/21 |
| | | | 210/493.5 |
| 7,441,665 B2 | 10/2008 | Bridges et al. | |
| 7,470,364 B2 * | 12/2008 | Oranski | B67D 1/16 |
| | | | 210/748.1 |
| 7,470,634 B2 | 12/2008 | Shin et al. | |
| 7,614,506 B2 | 11/2009 | Mitchell et al. | |
| 7,703,383 B2 | 4/2010 | Knitel | |
| 9,300,645 B1 * | 3/2016 | Rao | G06F 3/04886 |
| 9,365,434 B2 | 6/2016 | Wilder et al. | |
| 10,131,562 B1 * | 11/2018 | Madolora | C02F 3/00 |
| 2003/0034290 A1 * | 2/2003 | Tochikubo | B01D 39/2055 |
| | | | 210/243 |
| 2004/0104161 A1 * | 6/2004 | Gaignet | B01D 35/303 |
| | | | 210/323.2 |
| 2004/0206682 A1 * | 10/2004 | Hamlin | B01D 61/18 |
| | | | 210/321.86 |
| 2005/0023211 A1 | 2/2005 | Koslow | |
| 2005/0098495 A1 * | 5/2005 | Hughes | B01D 39/2065 |
| | | | 210/507 |
| 2007/0298064 A1 | 12/2007 | Koslow | |
| 2008/0110820 A1 * | 5/2008 | Knipmeyer | C02F 1/003 |
| | | | 210/477 |
| 2010/0093851 A1 * | 4/2010 | Blanton | C08K 3/015 |
| | | | 514/495 |
| 2010/0176044 A1 * | 7/2010 | Domb | B01J 20/103 |
| | | | 210/205 |
| 2012/0145651 A1 * | 6/2012 | Chen | B01D 65/108 |
| | | | 210/777 |
| 2013/0056428 A1 * | 3/2013 | Levy | C02F 1/283 |
| | | | 210/489 |
| 2014/0060727 A1 * | 3/2014 | Stouffer | B01J 20/20 |
| | | | 156/245 |
| 2014/0131264 A1 * | 5/2014 | Patera | C02F 1/003 |
| | | | 210/321.72 |
| 2016/0121249 A1 * | 5/2016 | Koslow | B01J 20/3078 |
| | | | 210/502.1 |
| 2017/0136403 A1 * | 5/2017 | Chung | B01D 53/0431 |

FOREIGN PATENT DOCUMENTS

| | | |
|---|---|---|
| CN | 106256777 A | 12/2016 |
| EP | 1 405 828 A1 | 4/2004 |
| WO | 2004/071961 A2 | 8/2004 |
| WO | 2004/082799 A1 | 9/2004 |
| WO | 2004/094036 A1 | 11/2004 |
| WO | 2005/092798 A1 | 10/2005 |
| WO | 2012/153330 A2 | 11/2012 |

* cited by examiner

WATER TREATMENT DEVICE

TECHNOLOGICAL FIELD

The present disclosure concerns a device for treating water of the kind intended for treating running water from a domestic water supply system or other sources of pressurized water, to obtain filtered or treated water, for example, of drinking water quality.

BACKGROUND ART

References considered to be relevant as background to the presently disclosed subject matter are listed below:
[1] U.S. Pat. No. 7,703,383
[2] U.S. Pat. No. 7,470,364
[3] WO 2012/153330
[4] U.S. Pat. No. 5,976,362
[5] U.S. Pat. No. 7,441,665
[6] U.S. Pat. No. 7,614,506
[7] WO 2004/071961
[8] WO 2005/092798
[9] U.S. Pat. No. 9,365,434
[10] US 2007/0298064
[11] WO 2004/082799
[12] US 2005/0023211

Acknowledgement of the above references herein is not to be inferred as meaning that these are in any way relevant to the patentability of the presently disclosed subject matter.

BACKGROUND

Various water filtering or treating devices are generally known, for example devices described in references [1]-[12]. Such filtering devices hold a filtering medium with reactants that can remove harmful or otherwise undesired substances from the water flowing therethrough.

GENERAL DESCRIPTION

Provided herein is a water treatment device for treating running water supplied by a pressurized water source, such as, but not limited to, running water from a domestic water supply. The device may be used in water dispensing systems or devices, such as countertop, under-the-sink or floor-standing water dispensing devices, in central water filtration systems and others. The device provided herein may also, by some embodiments, be used as a stand-alone device, e.g. for use in a centralized water filtration system. The device disclosed herein combines several treating and purification functions, for example removal of particulate matter, organic substances (particularly organic contaminants), heavy metals, arsenic, certain salts, calcium, and others, prevention of scale formation, disinfection by removal of bacteria and/or viruses, etc. The device of this disclosure may also have a functionality of adding to the water various ingredients, such as flavorings, nutrients, carbonates, etc.

It is of note that in the text below, reference will be made to "first", "second" and "third" elements. Such reference is made for convenience of description only, and is not meant to refer to any specific order or arrangement, unless specifically mentioned otherwise.

According to an aspect of this disclosure, there is provided a water treatment device for treating running water from a pressurized water source, comprising a housing with a running water inlet and a treated water outlet. The housing defines two or more cylindrical water treatment compartments, each having a longitudinal axis and having a water compartment inlet and a water compartment outlet. The treatment compartments are arranged in parallel one to the other, such that a water quantity that enters the device is divided by a manifold arrangement (to be described below) into at least two streams, each stream being treated in one of the compartments.

The housing further includes a manifold arrangement that comprises a water inlet-manifold and a water outlet-manifold. The water inlet-manifold has an inlet-manifold ingress in liquid communication with said running water inlet, and at least two inlet-manifold egresses, each of the egresses being in liquid communication with one of the water compartment inlets. Similarly, the water outlet-manifold has an outlet-manifold egress in liquid communication with the treated water outlet, and at least two outlet-manifold ingresses, each of the ingresses being in liquid communication with the water compartment outlets.

Each of the two or more water treatment compartments contains a first water treatment medium and a second water treatment medium. The first water treatment medium is in the form of a tubular porous block with a tubular block diameter, and formed about an axial lumen that has a lumen diameter. The ratio between the block diameter and the lumen diameter is between about 1.5 and 2. The second water treatment medium envelops the first water treatment media, and is in the form of a pleated fibrous sheet.

In operation, water is fed into the device from the running water source through the running water inlet which is in liquid communication with the inlet-manifold ingress. The water is split within the inlet-manifold into at least two streams, which drain from the inlet-manifold through the inlet-manifold egresses to the water compartment inlets. The water is then being treated within the compartments by the first and second treatment media, and exists the compartments through the compartment outlets. The compartment outlets are in liquid communication with the outlet-manifold ingresses, and hence treated water is collected within the outlet-manifold and unified to a single treated water stream. The treated water exists the outlet-manifold through the outlet-manifold egress and from there egresses from the device through the treated water outlet.

By this manner, the device permits efficient treating of large quantities of running water in a compact device.

In some arrangements, the compartment outlets are at a periphery of the water treatment compartments, while the compartment inlets are at about the center of the water treatment compartments.

In other arrangements, the compartment inlets are at a periphery of the water treatment compartments, while the compartment outlets are at about the center of the water treatment compartments. In such arrangements, the lumen is in liquid communication with the water compartment outlet, while the water compartment inlet feeds water into a space formed between the second water treatment medium and an internal face of the compartment.

Thus, in such embodiments, water that is fed into the compartment flows from the compartment inlet to the space formed between the second water treatment medium and the internal face of the compartment, through the second water treatment medium, then through the first water treatment medium, and is collected in the lumen before existing through the compartment outlet.

The first water treatment medium and the second water treatment medium in each compartment are typically arranged in an axis-symmetrical manner. Further, the two or more cylindrical water treatment compartments are typically identical one to the other, i.e. each of the compartment has the same dimensions, the same composition of treatment media and the same dimensions of the treatment media as in the other compartments.

According to some embodiments, the block diameter is between about 30 mm and 35 mm and the lumen diameter is between about 15 mm and 20 mm. According to other embodiments, the block diameter is between about 32 mm and 35 mm and the lumen diameter is between about 17 mm and 20 mm.

The water treatment medium refers a material or composition of matter that functions to reduce or eliminate one or more contaminants from the running water. The water treatment media may be a physical treating medium (e.g. functioning as a filter to filter out contaminants, such as particulate matter) and/or a chemical treating medium that functions by chemically reacting with the contaminant to thereby reduce its concentration in the water. Although the water treatment medium may be a single-function medium, in the device of the present disclosure at least one of the first and second treatment media is a multi-functional treatment medium (i.e. capable of providing two or more types of water treatments). It is to be understood that this disclosure further encompasses water treatment media that are used to add one or more additives into the water. Such additives, e.g. flavorings, nutrients, carbonates, etc., are released into the water when water is fed through such water treatment media.

By some embodiments, the first water treatment medium comprises activated carbon, at least one zeolite, at least one quaternary amine polymer, and silver bromide. The components of the first water treatment medium may be provided as a homogenous mixture. Alternatively, the components of the first water treatment medium may be arranged in layers. In another arrangement, the first treatment medium comprises an activated carbon porous block onto which the at least one zeolite, at least one quaternary amine polymer, and silver bromide are adsorbed or otherwise physically or chemically associated. Without wishing to be bound by theory, the activated carbon functions to adsorb organic contaminates from the running water, the zeolite functions to capture heavy metal contaminant (such as arsenic, lead, mercury, etc.), while the quaternary amine polymer and the silver bromide are used to reduce and eliminate microbial contaminants.

In some embodiments, the first water treatment medium may further comprise a polyphosphate. The polyphosphate typically reacts with calcium ions in the water, thus preventing scaling in the treated water. The polyphosphate may be present in the first water treatment medium at a concentration of between about 0.5 and 5 ppm.

In other embodiments, the polyphosphate may be added as a stand-alone component, e.g. in the form of granules or a compressed block (e.g. cylindrical or tubular block), as a third water treatment medium.

In some other embodiments, a third water treatment medium may comprise or consist of an additive substance that is designed to be released into the water when water is passed through the third water treatment medium, such as flavoring agents, nutrients, carbonates, etc.

Typically, such a third water treatment medium may be positioned within the lumen of the first water treatment medium. Alternatively, such the third water treatment medium may be in the form of a coating or partial coating on the internal face of the lumen.

As noted above, the second treatment medium is in the form of a pleated fibrous sheet, typically comprising cellulose fibers, and is used as a physical filter for filtering contaminates in particular form. In order to endow the second treatment medium with multi-functionality, the cellulose fibers may be mixed, coated or impregnated with additional functional components, e.g. at least one of activated carbon, a zeolite, a quaternary amine polymer, and silver bromide.

Thus, the combination of multi-functional treatment media with the parallel arrangement of the treatment compartments permits treating a relatively large volume of running water by removal of numerous contaminants of various types in different removal mechanisms, such that an effective water treatment at a relatively small and compact device with optimized water flow within the device is obtained.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

In the following description a specific embodiment of the invention for filtering and purifying source water into potable water will be described. It should be appreciated that the invention is not limited to this embodiment and the filter of the invention may be used for filtering and purifying any other liquid.

Reference is first being made to FIGS. 1-5 showing a water treatment device 100 according to an embodiment of this disclosure. In the description below, the device 100 will be exemplified with two treatment compartments, however it is appreciated that more than two compartments arranged in parallel one to the other may be used (e.g. 3, 4, 5 or more).

Figure 1:
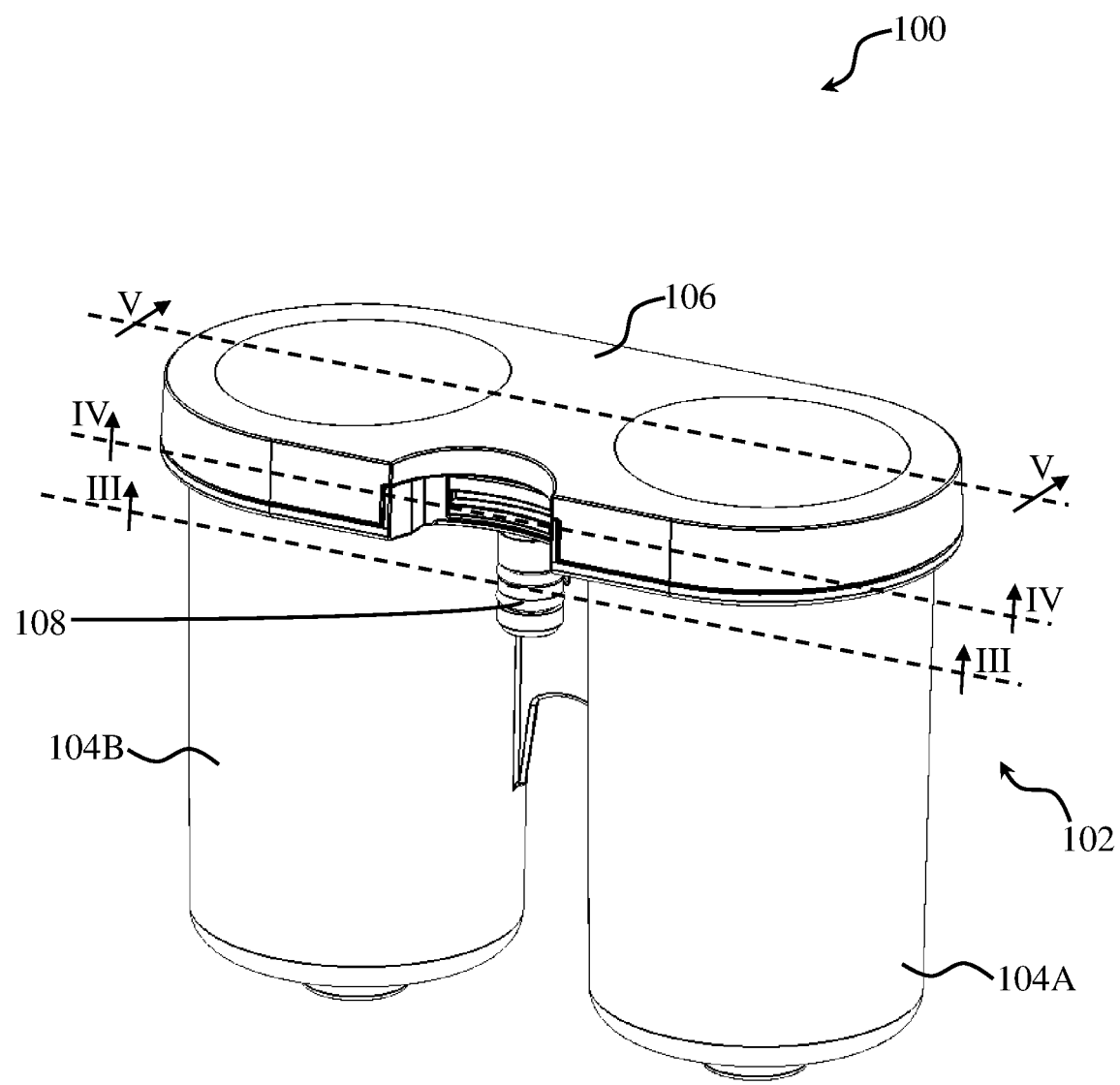
FIG. 1 is a perspective view of a water treatment device according to an embodiment of this disclosure.

Device 100 comprises a housing 102, that defines, in this exemplified device, two symmetrical water treatment compartments 104A and 104B. The device further comprises a lid 106, the function of which will be described in more details in connection with FIG. 4. Also seen in FIG. 1 is running water inlet 108, that allows connecting the device to a running water source. The treated water outlet 110 is not seen in this Figure, however can be seen in FIG. 3.

Figure 2:
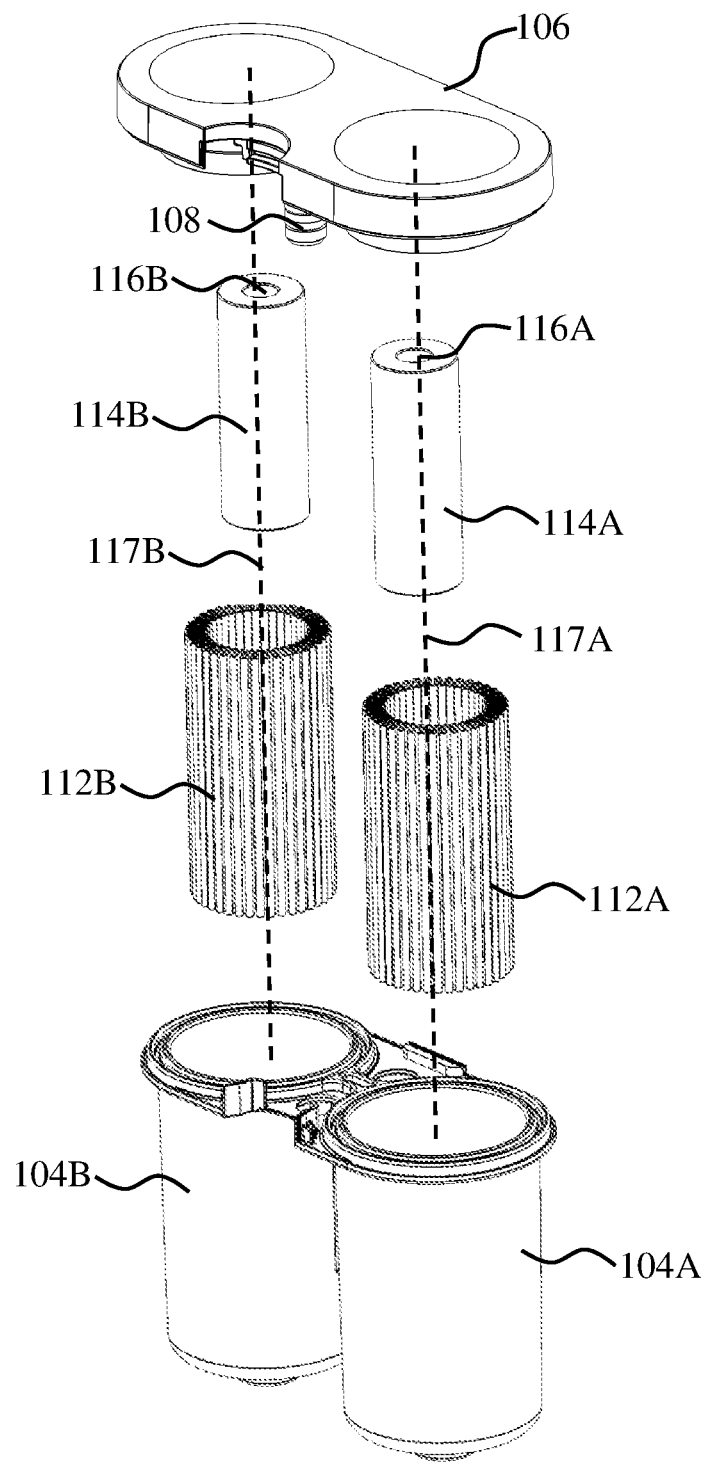
FIG. 2 is an exploded view of the water treatment device of FIG. 1.
Figure 3:
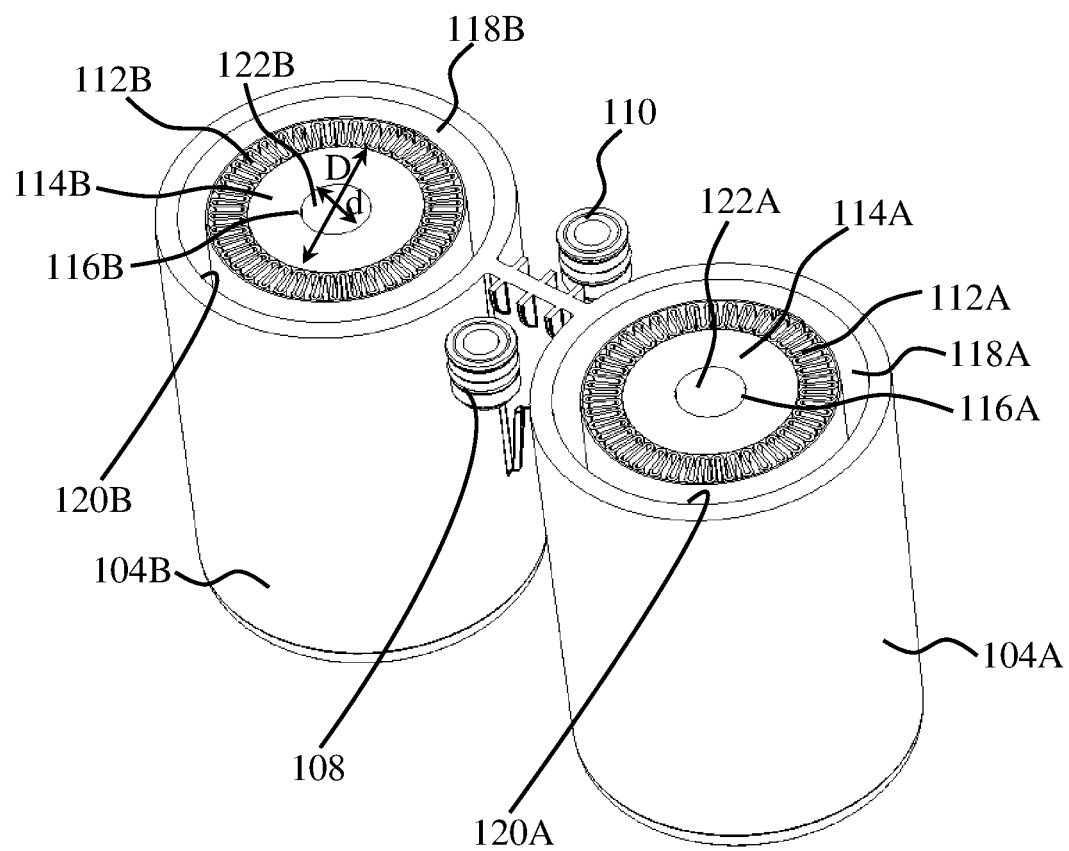
FIG. 3 is a perspective cross-section view along line III-III in FIG. 1.

As seen in FIGS. 2-3, each of the water treatment compartments 104A and 104B contains first water treatment media in the form of tubular solid blocks 114A and 114B, respectively, each enveloped by a pleated sheet 112A and 112B, respectively, of a second water treatment media. Each of the tubular solid porous blocks 114A, 114B had a tubular block diameter D, and defines an axial lumen 116A, 116B with a lumen diameter d, such that the ratio between the block diameter and the lumen diameter (D/d) being between 1.5 and 2. The inventors of the present invention have found that such a diameter ratio provides high water outflow flux (e.g. about 2 L/min) and also maintains effective removal of the contaminants from the water.

In each compartment 104A, 104B, the water compartment inlet 118A and 118B, is defined as the space formed between the pleated sheet 112A and 112B and the inner face 120A, 120B of compartments 104A and 104B, respectively. The compartment outlet 122A, 122B are defined by lumens 116A, 116B, respectively.

Figure 4:
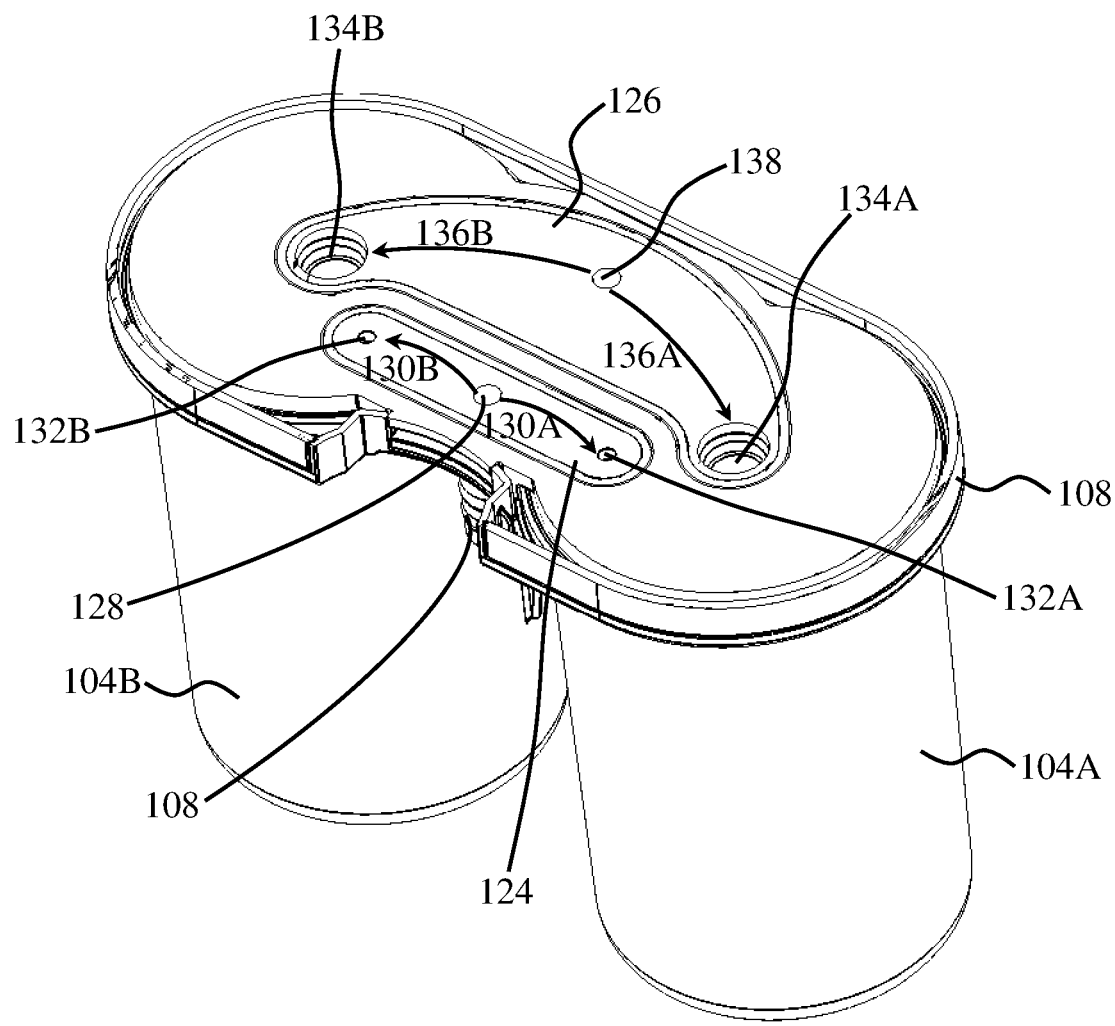
FIG. 4 is a perspective cross-section view along line IV-IV in FIG. 1.

FIG. 4 shows a cross-section through the lid 106. The lid 106 is a generally planar element, and defines therein, e.g. in the form of recesses, a water inlet-manifold 124 and a water outlet-manifold 126. Water fed into the device 100 through running water inlet 108, enter the inlet-manifold 124 through inlet-manifold ingress 128. In the inlet-manifold, the water is split into two streams (indicated by arrows 130A and 130B) and exists towards the compartments 104A, 104B through inlet-manifold egresses 132A and 132B, respectively. Inlet-manifold egresses 132A and 132B are in fluid communication with the water compartment inlet 118A and 118B. After water is treated by the first and second treatment medium, treated water are collected in lumens 116A, 116B, and exit the treatment compartments through compartment outlet 122A, 122B, respectively. The compartment outlet 122A, 122B are in liquid communication with outlet-manifold ingresses 134A, 134B, respectively, which feed treated water into outlet-manifold 126. In outlet-manifold 126, the treated water streams (indicated by arrows 136A and 136B) are unified, and drained through outlet-manifold egress 138 towards treated water outlet 110.

In operation, water is fed into the device 100 from the running water source through the running water inlet 108 which is in liquid communication with the inlet-manifold ingress 128. The water is split within the inlet-manifold 124 into at least two streams, which drain from the inlet-manifold through the inlet-manifold egresses 132A, 132B to the water compartment inlets 118A and 118B. The water is then being treated within the compartments by the second treatment media 112A and 112B and then by the first treatment media 114A, 114B, and exists the compartments through the compartment outlets 122A, 122B defined by lumens 116A, 116B, respectively. The compartment outlets 122A, 122B are in liquid communication with the outlet-manifold ingresses 134A, 134B, and hence treated water is collected within the outlet-manifold 126 and unified to a single treated water stream. The treated water exists the outlet-manifold 126 through the outlet-manifold egress 138 and from there egresses from the device through the treated water outlet 110.

Figure 5:
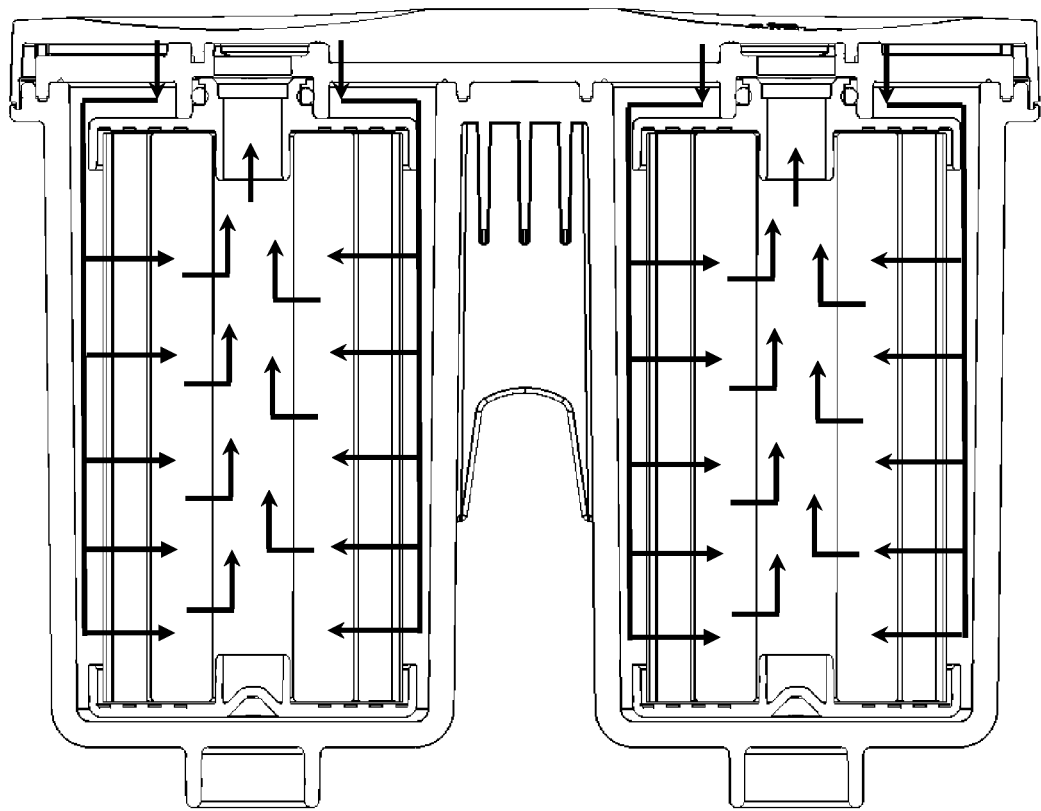
FIG. 5 is a longitudinal cross-section along line V-V in FIG. 1.

The water flow path within the device is schematically shown in FIG. 5.

Figure 6:
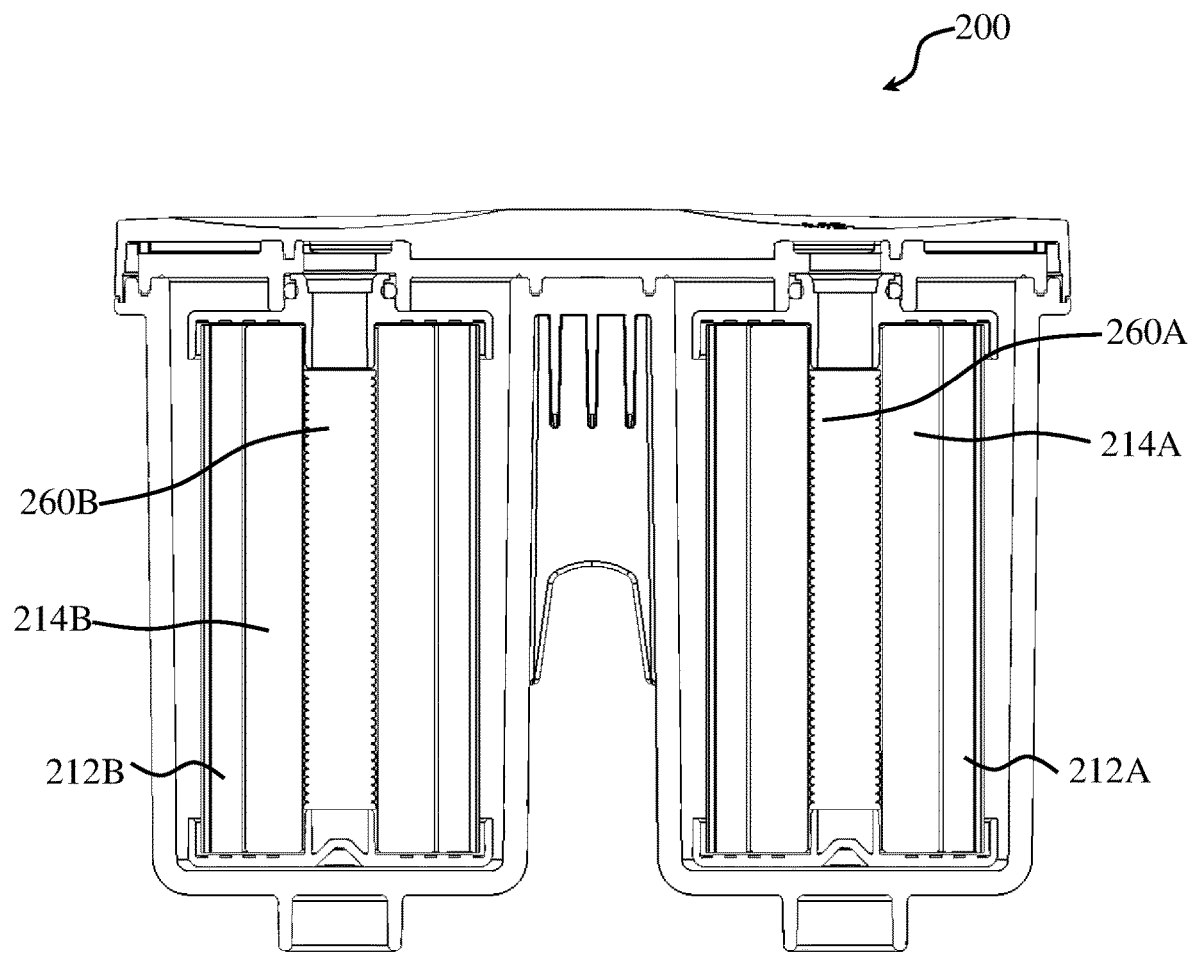
FIG. 6 is a longitudinal cross-section of a water treatment device that further comprises a third water treatment medium.

FIG. 6 shows a device 200, similar to the device 100, however also comprising a third water treatment medium, for example comprising or consisting of polyphosphate. In the exemplified embodiment, the third water treatment medium is in the form of cylindrical blocks 260A, 260B, positioned within the lumens of first treatment medium cylindrical blocks 214A, 214B, respectively. Thus, water is treated by second treatment medium (pleated sheet) 212A, 212B, then by the first water treatment medium 214A, 214B, and finally by the third water treatment medium 260A, 260B. Typically, the third water treatment medium comprises or consists of a polyphosphate. However, other substances may be utilized as a third water treatment medium, such as flavoring agents or nutrients that are released into the water from the third water treatment medium.

A device comprising a first water treatment media containing a mixture of activated carbon, zeolite, quaternary amine polymer, silver bromide and polyphosphate and a second water treatment media containing cellulose fibers impregnated with activated carbon particles, zeolite, quaternary amine polymer, and silver bromide was tested to assess its performance according to various standards.

First, the devices was tested for microbiology performance test according to the P231 (TW1) standard for bacterial and virus surrogate; the results are shown in Table 1.

TABLE 1

Microbiology performance according to P231 (TW1) standard

| Sample point | R. terrigena (CFU/100 mL) | | | MS-2 Phage (PFU/mL) | | |
|---|---|---|---|---|---|---|
| | Influent | Effluent | Log reduction | Influent | Effluent | Log reduction |
| 0 | $5.3 \times 10^8$ | <1 | >8.7 | $2.1 \times 10^5$ | <1 | >5.3 |
| 25% | $5.0 \times 10^7$ | <1 | >7.7 | $5.5 \times 10^4$ | <1 | >4.7 |
| 50% | $4.4 \times 10^7$ | <1 | >7.6 | $5.5 \times 10^4$ | <1 | >4.7 |
| $1^{st}$ 48 hr. stagnation | — | <1 | — | — | <1 | — |
| 60% | $3.7 \times 10^7$ | <1 | >7.6 | $9.2 \times 10^4$ | <1 | >5.0 |
| 75% | $1.8 \times 10^7$ | 5 | 6.6 | $6.5 \times 10^4$ | <1 | >4.8 |
| $2^{nd}$ 48 hr. stagnation | — | <1 | — | — | <1 | — |
| 100% | $4.2 \times 10^7$ | <1 | >7.6 | $2.0 \times 10^4$ | <1 | >4.3 |

As evident from Table 1, the treatment device meets the requirements defined in the P231 (TW1) formal standard requirements. Namely, reduction and elimination of the tested bacteria was observed throughout the test period of device; no growth of bacteria was observed during stagnation periods of the device.

The device was also tested for heavy metals and VOC (volatile organic compounds) reduction according to NSF 53 standard for reduction of asbestos and atrazine. The results are shown in Tables 2-1 and 2-2, respectively, in which the reduction was measured for each of the filtering unit in the device individually (marked in the Tables as "unit 1" and "unit 2").

TABLE 2-1

Asbestos reduction according to NSF 53 standard

| Sample point | Asbestos concentration (MFL*) | | |
|---|---|---|---|
| | Influent | Unit 1 | Unit 2 |
| 4$^{th}$ cycle | 100 | 0.18 | 0.18 |
| 25% flow decrease | 100 | 0.18 | 0.18 |
| 50% flow decrease | 100 | 0.18 | 0.18 |
| 75% flow decrease | 100 | 0.18 | 0.18 |

*MFL = million fibers per liter

TABLE 2-2

Atrazine reduction according to NSF 53 standard

| Sample point | Gallons | Atrazine concentration (μg/L)* | | |
|---|---|---|---|---|
| | | Influent | Unit 1 | Unit 2 |
| initiation | 2.0 | 9.9 | <0.2 | <0.2 |
| 25% | 132 | 9.9 | <0.2 | <0.2 |
| 50% | 264 | 9.9 | <0.2 | <0.2 |
| 75% | 396 | 9.9 | <0.2 | <0.2 |
| 100% | 528 | 9.21 | <0.2 | <0.2 |
| 120% | 634 | 9.28 | 0.228 | <0.2 |

*Detection limit—0.2 μg/L

Mercury and lead reduction was also tested according to NSF 53 standard, at a flow rate of 2 L/min, for a total filtration capacity of 2000 L, as shown in Tables 2-3 and 2-4, respectively.

TABLE 2-3

Mercury reduction according to NSF 53 standard

| Sample point | Liters | Mercury concentration (μg/L)* | | |
|---|---|---|---|---|
| | | Influent | Unit 1 | Unit 2 |
| 5% | 100 | 6.24 | <1.4 | <1.4 |
| 25% | 500 | 6.29 | <1.4 | <1.4 |
| 50% | 1000 | 5.84 | 1.24 | <1.4 |
| 75% | 1500 | 6.78 | <1.4 | <1.4 |
| 100% | 2000 | 5.61 | 1.13 | 1.14 |
| 120% | 2400 | 6.67 | 1.53 | 1.37 |

*Detection limit—1.4 μg/L

TABLE 2-4

Lead reduction according to NSF 53 standard

| Sample point | Liters | Lead concentration (μg/L)* | | |
|---|---|---|---|---|
| | | Influent | Unit 1 | Unit 2 |
| 5% | 100 | 149.4 | <4 | <4 |
| 25% | 500 | 155.2 | <4 | <4 |
| 50% | 1000 | 161.8 | <4 | <4 |
| 75% | 1500 | 167.2 | <4 | <4 |
| 100% | 2000 | 150.5 | <4 | <4 |
| 120% | 2400 | 155.9 | <4 | <4 |

*Detection limit—4 μg/L

Figure 7A:
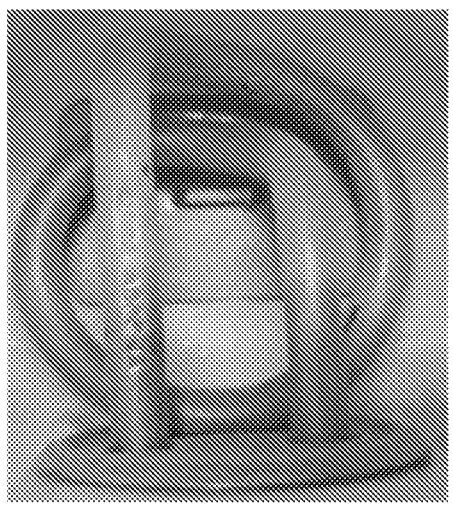
FIGS. 7A and 7B are pictures of heating units of electric kettles in which untreated water (FIG. 7A) and treated water (FIG. 7B) were boiled to estimate scale formation.
Figure 7B:
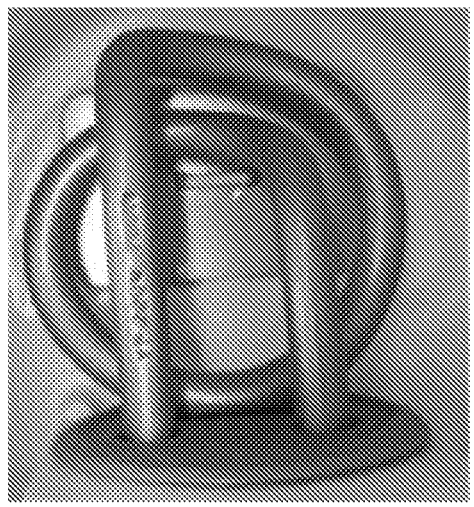

Finally, the device was tested to evaluate the scale-formation preventing. More than 1600 liters of water were passed through the filtering device, and boiled after egressing the device to estimate the formation of scale when boiling the treated water. FIG. 7A shows a heating unit of an electric kettle in which regular water were boiled, while FIG. 7B shows a heating unit of an identical electric kettle in which treated water was boiled. As evident from this comparison, water that were treated by the filtering device of the present disclosure did not show any scale formation at boiling, in comparison to scale formation that result when boiling untreated water.

The invention claimed is:

1. A water treatment device for treating running water from a pressurized water source, comprising a housing with a running water inlet and a treated water outlet, the housing defining:
   two or more cylindrical water treatment compartments, each having a longitudinal axis and having a water compartment inlet and a water compartment outlet, the treatment compartments being arranged in parallel one to the other;
   a water inlet-manifold having an inlet-manifold ingress in liquid communication with said running water inlet, and at least two inlet-manifold egresses, each of the egresses being in liquid communication with one of the water compartment inlets;
   a water outlet-manifold having an outlet-manifold egress in liquid communication with the treated water outlet, and at least two outlet-manifold ingresses, each of the ingresses being in liquid communication with the water compartment outlets;
   each of the two or more water treatment compartments comprising treatment media that comprises:
   a first water treatment medium in the form of a tubular porous block made of a first composition and having a tubular block diameter, and formed about an axial lumen having a lumen diameter, the ratio between the block diameter and the lumen diameter being between 1.5 and 2, and
   a second water treatment medium enveloping the first water treatment medium, the second water treatment media being in the form of a pleated fibrous sheet;
   in each of the two or more water treatment compartments, the water compartment inlet feeds water into a space formed between the second water treatment medium and an internal face of the compartment, such that the water flows (i) radially through the second water treatment medium, then (ii) radially through the first water treatment medium and into the axial lumen.

2. The water treatment device of claim 1, wherein the axial lumen of each of the first water treatment medium in each of the two or more compartments is in liquid communication with the water compartment outlet.

3. The water treatment device of claim 1, wherein the water compartment inlet feed water leads into a space formed between the second water treatment medium and an internal face of the compartment.

4. The water treatment device of claim 1, wherein the first composition comprises activated carbon, at least one zeolite, at least one quaternary amine polymer, and silver bromide.

5. The water treatment device of claim 4, wherein the activated carbon, at least one zeolite, at least one quaternary amine polymer, and silver bromide are provided in a substantially homogenous mixture.

6. The water treatment device of claim 4, wherein the first water treatment medium further comprises a polyphosphate.

7. The water treatment device of claim 6, wherein the polyphosphate is present in the first water treatment medium at a concentration of between about 0.5 and 5 ppm.

8. A water treatment device for treating running water from a pressurized water source, comprising
   a housing with a running water inlet and a treated water outlet, the housing defining:

two or more cylindrical water treatment compartments, each having a longitudinal axis and having a water compartment inlet and a water compartment outlet, the treatment compartments being arranged in parallel one to the other;

a water inlet-manifold having an inlet-manifold ingress in liquid communication with said running water inlet, and at least two inlet-manifold egresses, each of the egresses being in liquid communication with one of the water compartment inlets;

a water outlet-manifold having an outlet-manifold egress in liquid communication with the treated water outlet, and at least two outlet-manifold ingresses, each of the ingresses being in liquid communication with the water compartment outlets;

each of the two or more water treatment compartments comprising treatment media that consists of:

a first water treatment medium in the form of a tubular porous block having a tubular block diameter, and formed about an axial lumen having a lumen diameter, the ratio between the block diameter and the lumen diameter being between 1.5 and 2, a second water treatment medium enveloping the first water treatment medium, the second water treatment media being in the form of a pleated fibrous sheet, and a third water treatment medium that comprises polyphosphate and positioned within the axial lumen, such that the axial lumen envelops said third water treatment medium;

in each of the two or more water treatment compartments, the water compartment inlet feeds water into a space formed between the second water treatment medium and an internal face of the compartment, such that the water flows (i) radially through the second water treatment medium, then (ii) radially through the first water treatment medium and into the axial lumen, and then (iii) through the third water treatment medium positioned within the axial lumen.

9. The water treatment device of claim 8, wherein the third water treatment medium is in the form of a layer, coating an internal face of the axial lumen.

10. The water treatment device of claim 1, wherein the pleated fibrous sheet comprises cellulose fibers mixed, coated or impregnated with at least one of activated carbon, a zeolite, a quaternary amine polymer, and silver bromide.

11. The water treatment device of claim 1, wherein the first water treatment medium and the second water treatment medium in each compartment are axis-symmetrical.

12. The water treatment device of claim 1, wherein block diameter is between about 30 mm and 35 mm and the axial lumen diameter is between about 15 mm and 20 mm.

13. The water treatment device of claim 1, wherein block diameter is between about 32 mm and 35 mm and the axial lumen diameter is between about 17 mm and 20 mm.

14. The water treatment device of claim 1, wherein the two or more cylindrical water treatment compartments are identical one to the other.

15. The water treatment device of claim 8, wherein the third water treatment medium is in the form of a cylinder or a tubular block.

* * * * *